United States Patent
Ieda et al.

(10) Patent No.: US 7,096,935 B2
(45) Date of Patent: Aug. 29, 2006

(54) VEHICLE POWER SUPPLY CONTROL APPARATUS

(75) Inventors: Hisashi Ieda, Nagoya (JP); Mitsuyo Oomura, Hekinan (JP)

(73) Assignee: DENSO Corporation, Kariya (JP)

( * ) Notice: Subject to any disclaimer, the term of this patent is extended or adjusted under 35 U.S.C. 154(b) by 291 days.

(21) Appl. No.: 10/442,744

(22) Filed: May 21, 2003

(65) Prior Publication Data

US 2003/0217559 A1 Nov. 27, 2003

(30) Foreign Application Priority Data

May 22, 2002 (JP) .............................. 2002-148091

(51) Int. Cl.
*B60H 1/00* (2006.01)
*B60L 9/00* (2006.01)
*H01M 8/04* (2006.01)

(52) U.S. Cl. ........................... 165/202; 701/22; 429/26

(58) Field of Classification Search ................ 165/202, 165/253, 42, 43; 219/482–486, 490, 492, 219/497, 202; 307/10.7, 38, 131; 320/135; 429/26; 701/22, 36, 93, 99

See application file for complete search history.

(56) References Cited

U.S. PATENT DOCUMENTS

| 4,323,837 | A | * | 4/1982 | Nakamura et al. .............. 322/7 |
| 5,555,737 | A |   | 9/1996 | Takeo et al. |
| 5,856,711 | A | * | 1/1999 | Kato et al. ................... 307/10.7 |
| 6,064,937 | A | * | 5/2000 | Yang ............................ 701/93 |
| 6,713,729 | B1 | * | 3/2004 | Takeo et al. ................. 219/485 |
| 6,899,969 | B1 | * | 5/2005 | Kanno ........................... 429/26 |

* cited by examiner

*Primary Examiner*—Ljiljana Ciric
(74) *Attorney, Agent, or Firm*—Harness, Dickey & Pierce, PLC

(57) ABSTRACT

A power supply control for a vehicle includes air-conditioning electric devices and other electric devices. In the power supply control operation, current target power that is necessary for the specific electric device is calculated based on a precedent target power that was calculated the last time the specific electric device was used. An allowed power that is allowed to be supplied to the specific electric device is calculated based on the total power demand of the vehicle. The power to be supplied to the specific device is limited to the allowed power if the current target power is larger than the allowed power and the precedent target power is replaced with the allowed power if the actual power supplied to the specific electric device is limited to the allowed power.

15 Claims, 7 Drawing Sheets

FIG. 5A
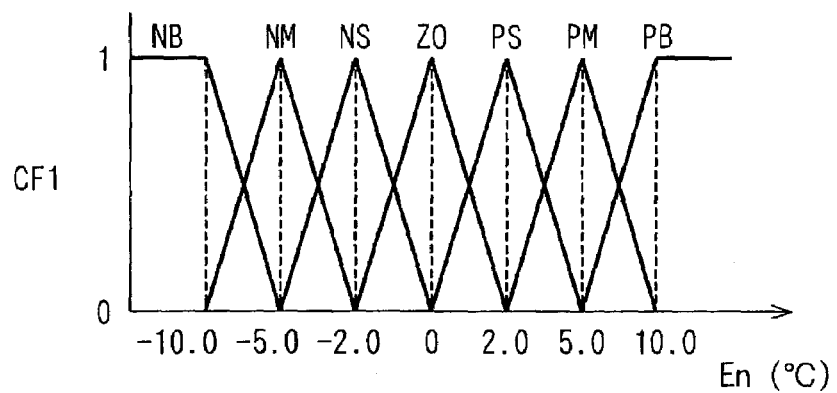
FIG. 5B
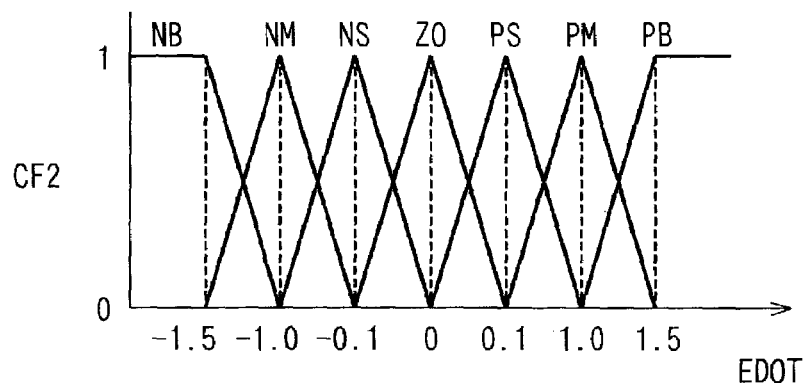
FIG. 6
| RULE VALUE A (W/4sec) | | En | | | | | | |
|---|---|---|---|---|---|---|---|---|
| | | NB | NM | NS | ZO | PS | PM | PB |
| EDOT | NB | -4000 | -3000 | -2000 | -1000 | -500 | -300 | 0 |
| | NM | -4000 | -2500 | -1000 | -500 | 200 | 500 | 1000 |
| | NS | -4000 | -2000 | -500 | -100 | 300 | 1000 | 2000 |
| | ZO | -4000 | -1500 | -400 | 0 | 400 | 1500 | 4000 |
| | PS | -2000 | -1000 | -300 | 100 | 500 | 2000 | 4000 |
| | PM | -1000 | -500 | -200 | 500 | 1000 | 2500 | 4000 |
| | PB | 0 | -300 | 500 | 1000 | 2000 | 3000 | 4000 |

VEHICLE POWER SUPPLY CONTROL APPARATUS

CROSS REFERENCE TO RELATED APPLICATION

The present application is based on and claims priority from Japanese Patent Application 2002-148091, filed May 22, 2002, the contents of which are incorporated herein by reference.

BACKGROUND OF THE INVENTION

1. Field of the Invention

The present invention relates to a vehicle power supply control apparatus for controlling power supplied to various devices powered by a vehicle battery, and particularly, electric devices of an air conditioning system.

2. Description of the Related Art

An air conditioning system of an electric vehicle driven by a battery-powered vehicle-driving motor includes electric devices such as an electric heater and a motor-driven compressor. Usually, electric power is supplied to the vehicle-driving motor prior to such battery-powered devices used in the air conditioning system.

For example, electric power to be supplied to an electric heater is controlled according to a calculated total demand for electric power to be used by a vehicle. The target amount of the electric power (hereinafter referred to as current target power) to be supplied to the electric heater is calculated based on a previously calculated amount of electric power (hereinafter referred to precedent target power). That is, the current target power is obtained from the precedent target power by adding or subtracting an amount of power to be changed to or from the precedent target power.

If the current target power to be supplied to the electric heater is smaller than an allowed amount (hereinafter referred to as allowed power) determined according to the calculated total demand for electric power to be used by the vehicle, the electric heater is fully supplied with sufficient power. On the other hand, the electric heater is supplied with a less amount of the electric power than the target power if the target power is larger than the allowed power. In this case, it is difficult for the electric heater to provide a suitable heating performance.

SUMMARY OF THE INVENTION

Therefore, it is a main object of the invention is to provide an improved vehicle power supply apparatus which can operate a battery powered device under a optimum condition even if an amount of electric power to be supplied to such an electric device is controlled according to a calculated total demand for electric power to be used by a vehicle.

A main feature of the invention, a power supply control apparatus is used for a vehicle that is equipped with a specific electric device and nonspecific electric devices that are powered by a battery. The power supply control apparatus calculates current target power that is necessary for the specific electric device based on precedent target power calculated last time, it calculates the allowed power that is allowed to be supplied to the specific electric device based on total power demand of the vehicle, it limits power to be supplied to the specific device to the allowed power if the current target power is larger than the allowed power, and it replaces the precedent target power with the allowed power if actual power supplied to the specific electric device is limited to the allowed power.

Therefore, the power to be supplied to the specific electric device such as an air-conditioning electric device is calculated based on the allowed power if the power supplied to the specific electric device is limited to the allowed power, so that the calculated power and actual power supplied to the specific device can be nearly the same.

According to an additional feature of the invention, the power supply control apparatus replaces the precedent target power with the allowed power only when a time period during which the actual power supplied to the specific electric device is limited to the allowed power is longer than a predetermined time. If the power supply to the specific electric device is limited to the allowed power for a short time, significant inconvenience can be avoided.

According to another additional feature of the invention, the power supply control apparatus replaces the precedent target power with the allowed power only when the current target power is a predetermined value larger than the allowed power.

According to another additional feature of the invention, the power supply control apparatus replaces the precedent target power with the allowed power only if the following conditions are given: (1) a time period during which the actual power supplied to the specific electric device is limited to the allowed power is longer than a predetermined time; and (2) the actual target power is a predetermined value larger than the allowed power.

According to further additional feature of the invention, the above power supply control apparatus further calculates an allowed-power-for-protection when the specific electric device is to be protected, and it limits power supplied to the specific electric device to the allowed-power-for-protection when the current target power is larger than the allowed-power-for-protection. Here, the power supply control apparatus replaces the precedent target power with the allowed-power-for-protection.

According to another main feature of the invention, a power supply control apparatus for a vehicle calculates a target value of operating condition of the specific electric device based on precedent target value of operating condition calculated last time; it calculates target power that is necessary for the specific electric device; it calculates allowed power that is allowed to be supplied to the specific electric device based on total power demand of the vehicle; it limits power to be supplied to the specific device to the allowed power if the current target power is larger than the allowed power; and it replaces the precedent target value of operating condition with the actual value of operating condition if actual power supplied to the specific electric device is limited to the allowed power.

Therefore, the power to be supplied to the specific electric device such as a motor driven compressor is calculated based on the allowed power if the power supplied to the specific electric device is limited to the allowed power, so that the calculated target value and the actual value can be nearly the same.

According to another feature in addition to the above another main feature, the power supply control apparatus replaces the precedent target value with the actual value only when a time period during which the actual power supplied to the specific electric device is limited to the allowed power is longer than a predetermined time.

According to another feature in addition to the above another main feature, the power supply control apparatus replaces the precedent target value with the actual value only when the current target power is a predetermined value larger than the allowed power.

According to another feature in addition to the above another main feature, the power supply control apparatus replaces the precedent target value with the actual value only if the following conditions are given: (1) a time period during which the actual power supplied to the specific electric device is limited to the allowed power is longer than a predetermined time; and (2) the actual target power is a predetermined value larger than the allowed power.

According to another feature in addition to the above another main feature, the power supply control device further calculates an allowed-power-for-protection when the specific electric device is to be protected, and it limits power supplied to the specific electric device to the allowed-power-for-protection when the current target power is larger than the allowed-power-for-protection. Here, the power supply control apparatus replaces the precedent target value with the actual value.

According to further main feature of the invention, a power supply control apparatus for a vehicle includes the following units: a first control unit that calculates target power to be supplied to the specific electric device and it transmits a signal indicating the calculated target power to a second control unit; and the second control unit calculates allowed power and transmits a signal indicating the allowed power if the target power is higher than the allowed power. Here, the first control unit limits power to be supplied to the specific electric device, and feeds back the signal indicating the allowed power.

According to another feature in addition to the above further main feature, the first control unit replaces the target power with the allowed power when the allowed power is a predetermined value smaller than the target power.

According to another feature in addition to the above further main feature, the first control unit is a power control unit for controlling power supply to an air-conditioning electric device, and the second control unit is a power control unit for controlling power supply to an electric device other than the air-conditioning electric device.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 5A and 5B are graphs showing membership functions;

FIG. 6 is a table showing a rule for providing target amounts of electric power;

DETAILED DESCRIPTION OF THE PREFERRED EMBODIMENTS

A power supply control system according to a preferred embodiment of the invention will be described with reference to the appended drawings.

Figure 1:
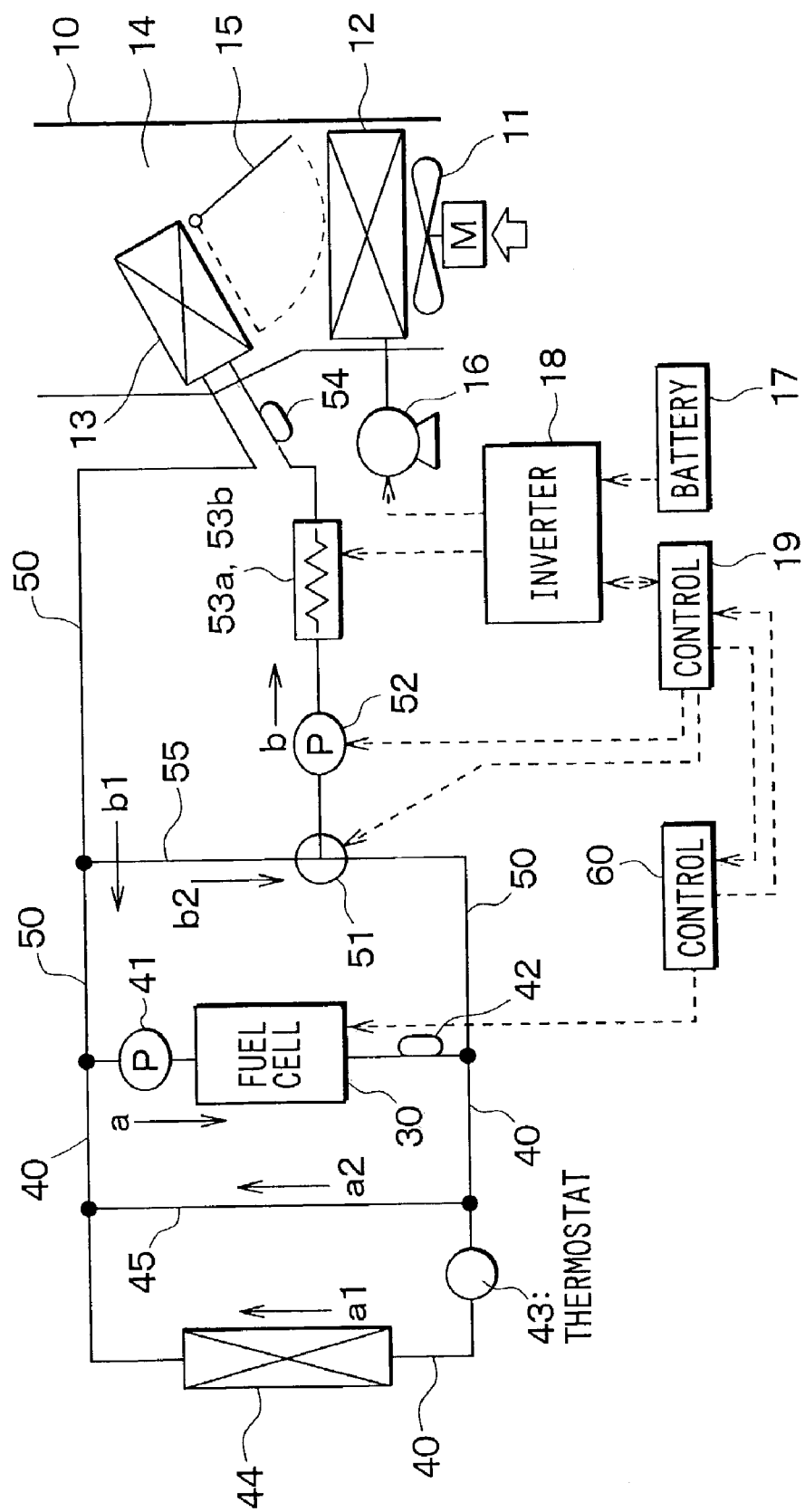
FIG. 1 is a schematic circuit diagram of an air condition system that includes a power supply control apparatus according to a preferred embodiment of the invention.

As shown in FIG. 1, an air duct 10 accommodates a blower 11, an evaporator 12, a heater core 13, and an air-mix damper 14. The blower 11 takes air in from an inside air-intake port or an outside air-intake port. The evaporator 12 is disposed downstream in the intake-air flow driven by the blower 11 to cool the intake-air by heat-exchange with refrigerant, providing air-conditioned air. The heater core 13 is disposed downstream in the air-conditioned air flowing from the evaporator 12 to heat the air-conditioned air by heat-exchange with hot water. The heater core 13 closes approximately a half the cross-section of the air duct 10 to form a parallel air bypass passage 14. The air mix damper 15 is disposed upstream in the air flow with respect to the heater core 13 to rotate and control the ratio of the air heated by the heater core 13 to the air flowing through the bypass passage 14. Although not shown, there are a defroster outlet for blowing the air-conditioned air on a windshield, a face blow outlet for blowing the air-conditioned air to the waist of a driver or passenger and a foot blow outlet for blowing the air-conditioned air to the feet of the driver or passenger at the extremely downstream portion of the air duct 10.

A motor-driven compressor 16, which compresses refrigerant, constitutes a refrigeration cycle together with a condenser and an expansion valve. The motor-driven compressor 16 includes a compressor section and an ac motor section. The ac motor section is driven by an inverter 18 that is powered by a vehicle battery 17 whose terminal voltage is 300 V, for example. The battery 17 is charged by a fuel cell 30, which generates electric power by chemical reaction of oxygen and hydrogen.

A first cooling water circuit 40 is formed to control operation temperature of the fuel cell 30. The first cooing water circuit 40 includes a first water pump 41, the fuel cell 30, a first water temperature sensor 42, a thermostat 43 and a radiator 44. The first water pump 41 circulates the cooling water in the direction indicated by an arrow a. The first water temperature sensor 42 senses temperature of the cooling water that has passed the fuel cell 30, and the thermostat 43 opens or closes the first cooling water circuit 40 according to the temperature sensed by the first water temperature sensor 42. The first cooling water circuit 40 includes a first bypass circuit 45 that connects the upstream side of the first water pump 41 and the downstream side of the fuel cell 30. When the temperature of the cooling water rises higher than a maximum set temperature, the thermostat 43 opens to allow the cooling water to flow in the direction indicated by an arrow a1 to the radiator 44. Accordingly, the cooling water is cooled. On the other hand, the thermostat 43 closes when the temperature of the cooling water lowers to a level lower than a minimum set temperature. Accordingly, the cooling water flows in a direction indicated by an arrow a2 through the bypass circuit 45 back to the first water pump 41. Thus, the operation temperature of the fuel cell is controlled within an operation temperature range to generate power at a highest efficiency.

The cooling water heated by the fuel cell 30 flows to the heater core 13 through a second cooling water circuit 50, so that the heat energy of the cooling water can be used for heating. An end of the second cooling water circuit 50 is connected to the first cooling water circuit 40 at a portion of the circuit 40 after the fuel cell 30, and the other end of the second cooling water circuit 50 is connected to the first cooling water circuit 40 at a portion of the circuit 40 before the first water pump 41.

The second cooling water circuit 50 includes a three-way valve 51, a second motor-driven water pump 52, a pair of first and second electric heaters 53a, 53b, a second temperature sensor 54 and the heater core 13. The three-way valve 51 changes cooling water to flow from one way to the other. The second motor-driven water pump 52 circulates the cooling water in a direction indicated by an arrow b, and the second temperature sensor 54 senses temperature of the cooling water that has passed the electric heaters 53a, 53b. A second bypass circuit 55 branches off the second cooling water circuit 50 at a portion in the circuit 50 lower than the heater core 13 and connected to the three-way valve 51.

The first and the second electric heaters 53a, 53b are supplied with duty-controlled ac power by the inverter 18, which is powered by the battery 17. The first and second electric heaters 53a, 53b respectively have sheathed Nichrome heater wires, each of which has 30 ohms in resistance and a rated output power of 3 kW/300V.

Figure 2:
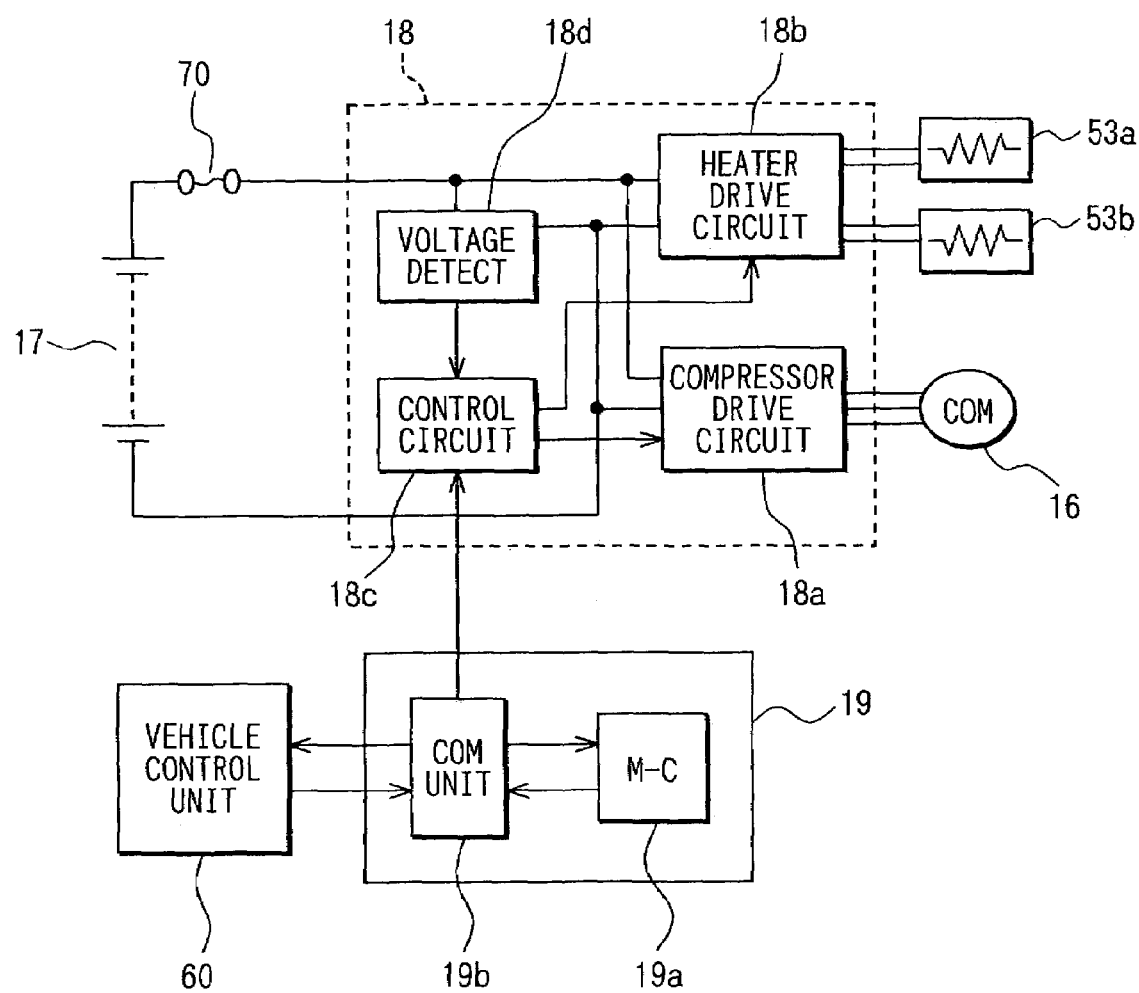
FIG. 2 is a block diagram of the power supply control apparatus shown in FIG. 1.

As shown in FIG. 2, an air-conditioner control unit 19 includes a microcomputer 19a and a communication unit 19b. The microcomputer 19a includes a CPU, ROM, RAM, etc. The air-conditioner control unit 19 controls the air-mix damper 15, the inverter 18, the three-way valve 51, the second water pump 52, the first and second electric heaters 53a, 53b, etc. based on processes executed according to programs and maps included in the microcomputer 19a. A vehicle control unit 60 includes a microcomputer and a communication unit. The vehicle control unit 60 controls a vehicle drive motor according to a depression amount of an accelerator pedal of a vehicle and output power of the fuel cell 30 according to operating conditions of the vehicle battery 17. The communication unit of the vehicle control unit 60 exchanges data signals with the communication unit 19b of the air-conditioner control unit 19.

As shown in FIG. 2, dc power is supplied to the inverter 18 from the battery 17 via a fuse 70. The inverter 18 includes a compressor driving circuit 18a, a heater driving circuit 18b, a control circuit 18c and a battery voltage detecting circuit 18d.

The compressor driving circuit 18a switches dc current on and off to provide ac power of variable frequency for controlling the rotation speed of the motor-driven compressor 16. The heater driving circuit 18b switches dc current on and off to provide duty-controlled power supplied to the first and second electric heaters 53a, 53b. Accordingly, the first and second electric heaters 53a, 53b are supplied with electric power of the same voltage as the battery voltage. The compressor driving circuit 18a and the heater driving circuit 18b respectively include switching elements such as insulated gate bipolar transistors (IGBT). The control circuit 18c controls the compressor driving circuit 18a and the heater driving circuit 18b according to signals sent from the air-conditioner control unit 19, and the battery voltage detecting circuit 18d detects the terminal voltage of the battery 17 and sends an output signal to the air-conditioner control unit 19.

Figure 3A:
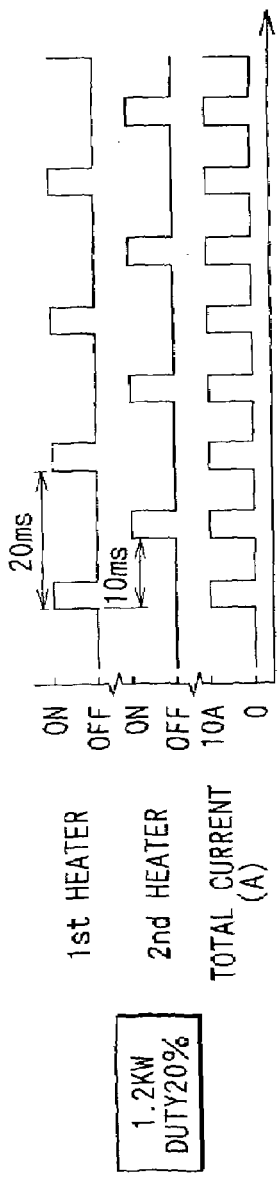
FIGS. 3A, 3B and 3C are graphs showing duty control operation of a pair of electric heaters.
Figure 3B:
Figure 3C:
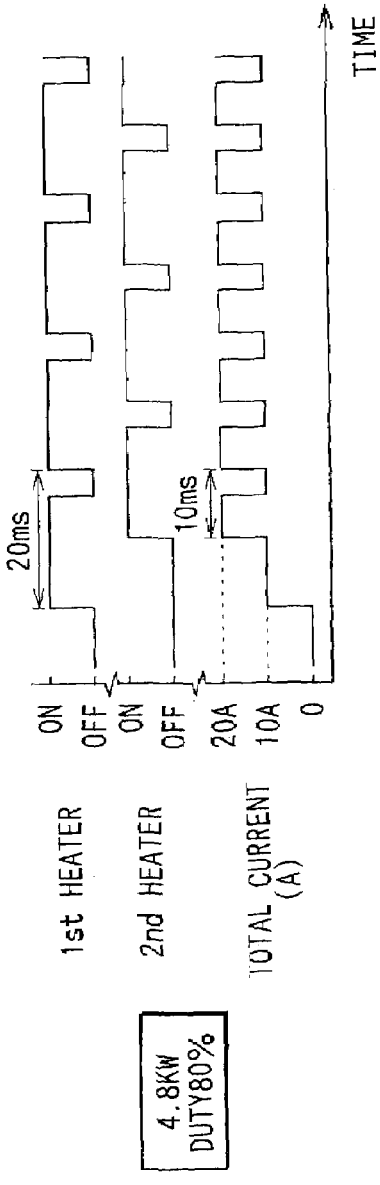

As shown in FIGS. 3A–3C, the duty ratio of the current supplied to the first and second electric heaters 53a, 53b is controlled at a cycle of 20 ms. The first and second electric heater 53a, 53b are alternately turned on at timings that are 10 ms shifted from each other. In other words, the first electric heater 53a is supplied with an amount of current (e.g. 10 A) at a timing that is a half cycle shifted from a timing at which the second electric heater 53b is supplied with an amount of current (e.g. 10 A). Since the first and second electric heaters 53a, 53b are controlled at the same duty ratio, they are respectively turned off at timings that are a half cycle shifted from each other. If the duty ratio is less than 50%, only one of the first and second heaters 53a, 53b is powered at any time so that the total amount of the current supplied to the heaters changes between 0A and 10 A, as shown in FIGS. 3A and 3B. On the other hand, if the duty ratio is more than 50%, the total amount of the current supplied to first and the second electric heaters 53a, 53b changes between 10A and 20A. Thus, variation in the current supplied to the electric heaters 53a, 53b is as much as 10 A, which is a half of the variation of the current (e.g. 20 A) supplied to both the first and the second electric heaters 53a, 53b at the same timing. Accordingly, the battery voltage can be maintained more stable when the first and second electric heaters 53a, 53b are alternately powered than when they are concurrently powered.

The air-conditioner control unit 19 receives various signals such as temperature of the passenger compartment, outside temperature, an amount of solar radiation in the passenger compartment, a set temperature of the passenger compartment, as well as signals from the battery voltage detecting circuit 18d, the first water temperature sensor 42 and second water temperature sensor 54.

The air-conditioner control unit 19 calculates a target air-blow temperature TAO based on the above signals and controls the air mix damper 15, the motor-driven compressor 16, the inverter 18, the three-way valve 51, the second water pump 52 and the first and second electric heaters 53a, 53b so that the temperature of the air blown into the passenger compartment can be as high as the target air-blow temperature TAO.

When an air-conditioning switch is turned on, the air conditioner control unit 19 drives the second water pump 52 and controls the three-way valve 51 according to the signal provided by the first water temperature sensor 42 to switch the cooling water flow in the second cooling water circuit 50 from one way to the other.

For example, if the temperature of the water that has passed the fuel cell 30 becomes as high as a predetermined temperature for heating the air-conditioned air, the three-way valve 51 is controlled to close the passage between the second cooling water circuit 50 and the second bypass circuit 55. Accordingly, the fuel cell 30, a circuit connecting the first and second electric heaters 53a, 53b and the heater core 13 is formed, so that the water that has passed the fuel cell 30 flows through the first and second electric heaters 53a, 53b and the heater core 13 and returns the fuel cell 30. In this case, the first and second electric heaters 53a, 53b are not powered.

On the other hand, if the temperature of the water that has passed the fuel cell 30 is lower than the predetermined temperature, the passage between the second bypass circuit 55 and the upper side of the second cooling water pump 52 is opened and the passage between the second bypass circuit 55 and the lower side of the fuel cell 30 is closed. Accordingly, the water that has passed the heater core 13 returns to the second water pump 52 through the second bypass circuit 55, as shown in an arrow b2 and does not flow to the fuel cell 30. In this case, electric power supplied to the first and second electric heaters 53a, 53b is controlled according to the signal provided by the second temperature sensor 54 to control the temperature of the water that flows into the heater core 13.

The operation of the air-conditioner control unit 19 that controls the first and second electric heaters 53a, 53b will be described with reference to a flow diagram shown in FIG. 4.

Figure 4:
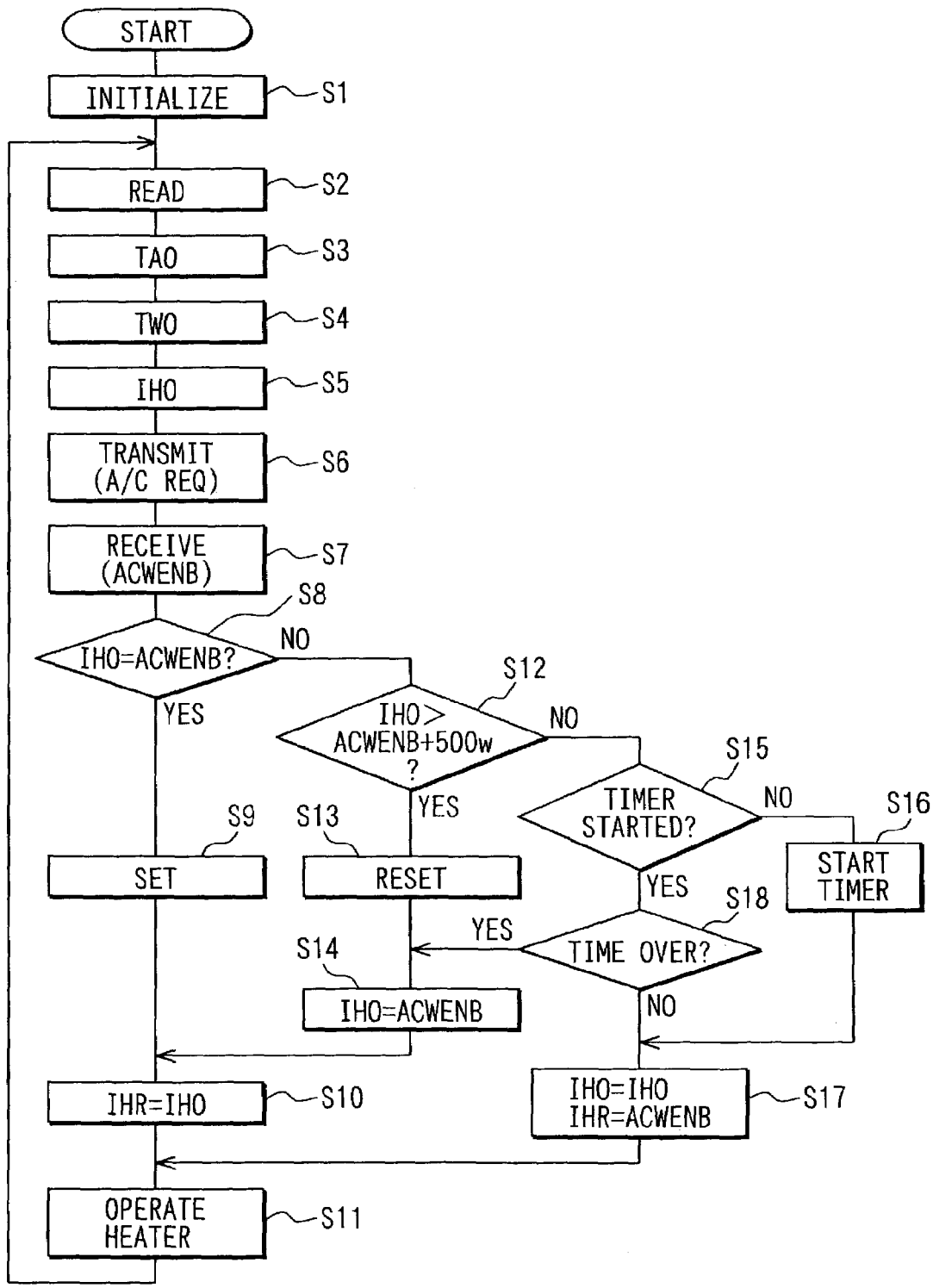
FIG. 4 is a flow diagram of the operation of the power supply control apparatus.

When the air-conditioner control unit 19 (first control unit) is powered, a routine shown in FIG. 4 is started, and initializations and settings are carried out at step S1. Next, signals provided by sensors and switches are read at step S2, and a target temperature TAO is calculated at step S3. Then, a target water temperature TWO of the cooling water is calculated according to the following formula N1: TWO=(TAO−TIN)/ϕ+TIN, wherein ϕ is a temperature efficiency of the heater core 13 that is calculated from fan capacity, and TIN is a temperature of the air taken into the air duct 10. At the next step S5, control unit 19 has means for calculating a current target power IHO of the first and second heaters 53a, 53b. The current target power IHO is a total amount of the electric power to be supplied to the first and second electric heaters 53a, 53b in order to control the temperature of the air blown out of the heater core 13 at the target temperature TWO. The current target power IHO is total electric power necessary for the first and second electric heaters 53a, 53b.

At first, a difference En between the target water temperature TWO and actual water temperature TW is calculated according to the following formula N2.

$$E_n = TWO - TW. \qquad \text{N2}$$

In the heating mode, the position of the air-mix damper 15 is controlled to pass all the air blown by the blower 11 through the heater core. Therefore, the water temperature TW corresponds to the temperature of the air blown into the passenger compartment. That is, the difference En is a physical value that corresponds to the difference between the actual air temperature blown into the passenger compartment and the TAO.

Then, a rate of change of the difference EDOT is calculated according to the following formula: $EDOT = E_n - E_{n-1}$, wherein $E_{n-1}$ is a precedent difference. Because En is renewed every 4 seconds, $E_{n-1}$, is a value of 4 seconds before.

Thereafter, a target differential Δ fH is provided according to the difference En and the rate of change of the difference EDOT by membership functions stored in a ROM shown in FIGS. 5A and 5B and a rule shown in FIG. 6. The target differential Δ fH is a value that is increased to or decreased from the target power $IHO_{n-1}$ that is the target electric power of 4 seconds before.

In order to provide the target differential Δ fH CF-values CF1, CF2 are obtained respectively from the membership functions shown in FIGS. 5A and 5B. Then, a goodness of fit CF is calculated by the following formula N4:

$$CF = CF1 + CF2 \qquad \text{N4}$$

Then, the target differential is calculated by the following formula N5.

$$\Delta fH = (CF \times \Sigma \text{ rule values } A) \qquad \text{N5}$$

The target power IHO is calculated by the following formula N6.

$$IHO = IHO_{n-1} + \Delta fH \qquad \text{N6}$$

After the target power is calculated at step 5, control unit 19 includes first means for transmitting to transmit a signal of a required amount of electric power for the air conditioning A/C REQ that corresponds to the target power IHO to the vehicle control unit 60 (second control unit).

The vehicle control unit 60 includes means for calculating allowed power which calculates an available amount of power (hereinafter referred to as available power) that is available to the first and second electric heaters 53a, 53b based on the total demand of power of the vehicle. If the available power is smaller than the required amount A/C REQ, the available power is determined to be an allowed power for the air conditioning ACWENB. If the available power is larger than the required amount A/C REQ, the same amount as the required amount A/C REQ is determined to be the allowed power ACWENB.

Control unit 60 includes second means for transmitting to transmit the signal that corresponds to the allowed power ACWENB to the communication unit 19b of the air-conditioner control unit 19, from where the signal of the allowed power ACWENB is fed back to the microcomputer 19a at step S7. Then, the target power IHO and the allowed power ACWENB are compared with each other at step S8.

If both are equal to each other, the timer is reset at step S9 and step S10 is carried out to determine the target power IHO to supply an actual amount of power IHR (hereinafter referred to as actual power IHR) to be supplied to the first and second electric heaters 53a, 53b. At the next step S10, the heater driving circuit 18b of the inverter 18 is controlled so that the actual power IHR can be supplied to the first and second electric heaters 53a, 53b. Then, the process returns to step S2.

If both the target power IHO and the allowed power ACWENB are not equal to each other, the process jumps from step S8 to step S12. At step S12, whether the target power IHO is larger by a predetermined value (e.g. 500 watts) than the allowed power ACWENB or not is examined. If the difference between the target power IHO and the allowed power ACWENB is larger than the predetermined value (e.g. 500 watts), the step S12 issues YES, so that the timer is reset at step S13. Thereafter, control unit 19 includes means for limiting power to be supplied and renews the target power IHO to be equal to the allowed power ACWENB at step S14.

When the process proceed from step S14 to step S10, the allowed power ACWENB is set as the actual power IHR. Then, the driving circuit 18b of the inverter 18 is controlled at step S11 so that the electric power that corresponds to the allowed power ACWENB can be supplied to the first and second electric heaters 53a, 53b. Thereafter, the process returns to step S2.

Thus, while the process passing through step S14 is being carried out, control unit 19 includes means for replacing the target power that replaces the target power IHO with the allowed power ACWENB. Therefore, when the current target power IHO is calculated at step S5, the allowed power ACWENB is used instead of the precedent target power $IHO_{n-1}$.

If the difference between the target power IHO and the allowed power ACWENB is equal to or less than 500 watts, NO is issued at step S12, and the process proceeds to step S15. When the process proceeds to step S15 first time, the timer does not start. Therefore, the process proceeds from step S15 to step S16 to start the timer. Thereafter, the process proceeds to step S17. Until a predetermined time has passed after NO is issued at step S12, NO is issued at step S18 if YES is issued at step S15. Therefore, the process proceeds to step S17, where the target power IHO is not renewed, and the allowed power ACWENB is set as the actual power IHR. The process proceeds from step S17 to step S11, where the heater driving circuit 18b so that electric power that corresponds to the allowed power ACWENB can be supplied to the first and second electric heaters 53a, 53b. Thereafter, the process returns to step S2.

Thus, as long as the control process passes through the step S17, the target power IHO is not renewed. Therefore, when the target power is calculated again at step S5, the precedent target power $IHO_{n-1}$ is continuously used for the current target power IHO.

When a predetermined period has passed after NO is issued at step S12, step S18 issues YES to proceed to step S14. Thus, as long as the control process passing through the step S14, the target power IHO is replaced by the allowed power ACWENB. Therefore, when the target power IHO is calculated again at step S5, the allowed power ACWENB is used for the precedent target power $IHO_{n-1}$.

Figure 7A:
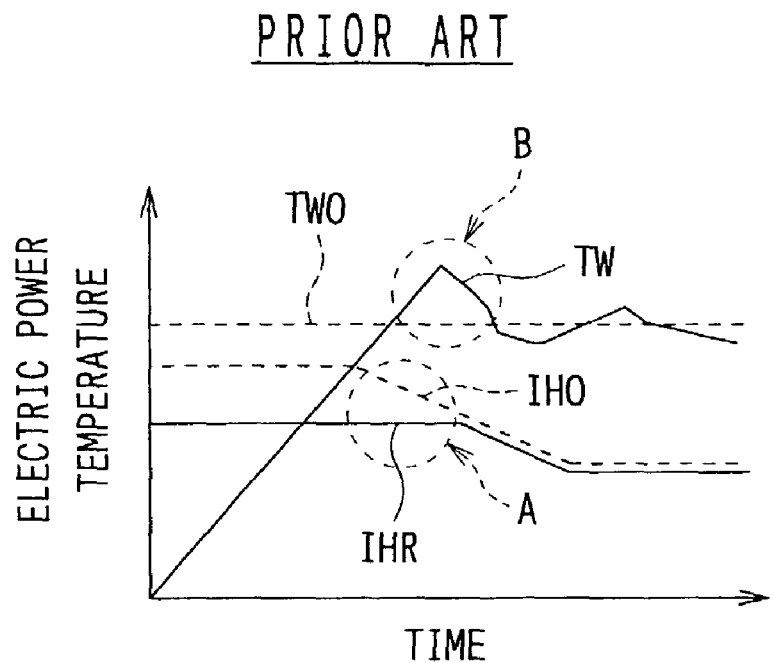
FIGS. 7A and 7B are graphs comparing control operation of the preferred embodiment with a prior art.
Figure 7B:
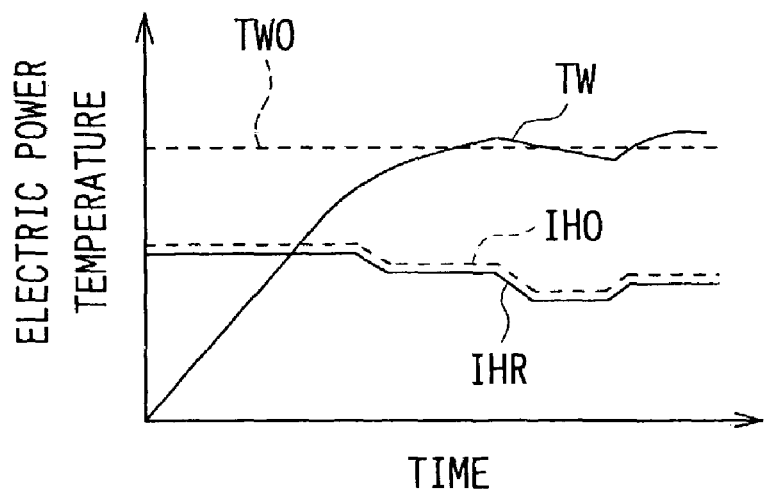

Therefore, the calculated current target power IHO becomes equal to the actual power IHR supplied to the first and second electric heaters 53a, 53b so that excellent control can be maintained, as shown in FIG. 7B, as compared with operation without control shown in FIG. 7A. In the operation shown in FIG. 7A, the actual power IHR is limited by the allowed power ACWENB. If the target power IHO is different from the actual power IHR, the actual power IHR does not change even if the target power IHO is decreased as in the area encircled by A. As a result, the actual water temperature TW may overshoot as shown in the area encircled by B. On the other hand, the target power IHO and the actual power IHR become equal with each other in the operation according to the preferred embodiment, so that the water temperature TW does not overshoot, as shown in FIG. 7B.

Figure 8A:
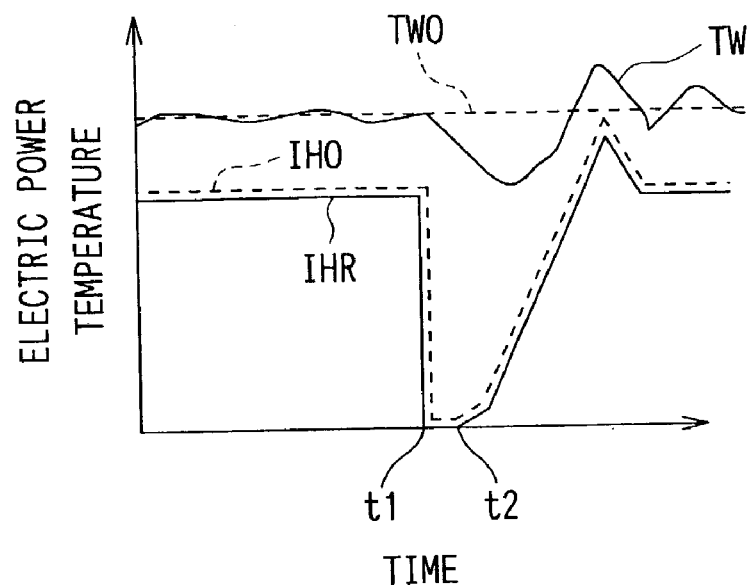
FIGS. 8A and 8B are graphs comparing control operation of the preferred embodiment with a prior art.

In case the actual power IHR is limited to the allowed power ACWENB, the following inconvenience may arise. If the allowed power ACWENB becomes zero while a vehicle is accelerating for seconds from time t1 to time t2, the actual water temperature TW starts falling at time t1, as shown in FIG. 8A. Electric power supply to the first and second electric heaters 53a, 53b is resumed at time t2. If the target power IHO is replaced by the allowed power ACWENB, calculation of the target power IHO has started from zero at time t2. Therefore, it takes such a long time until the actual power IHR rises to a sufficiently high level that the actual water temperature TW further falls before gradually rising again. This may cause hunting of the water temperature condition.

Figure 8B:
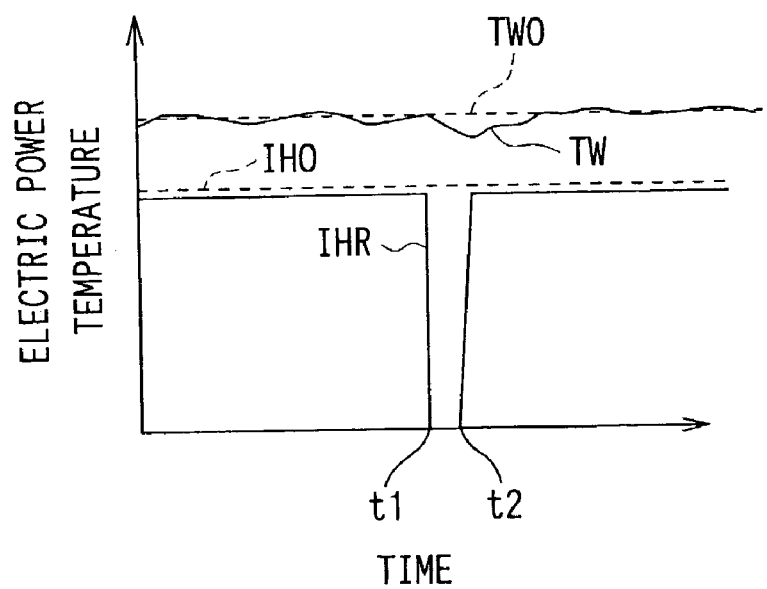

On the other hand, if the actual power IHR is not limited to the allowed power or limited to the allowed power only for a very short time, it is possible to prevent the above-stated inconvenience by maintaining the target power to be unchanged as long as the control process that passes through the step S17 is carried out. As shown in FIG. 8B, the target power IHO is not changed even if the allowed power ACWENB becomes 0 at time t1, so that sufficient power can be supplied to the first and second electric heaters 53a, 53b as soon as the power supply is resumed.

In the above embodiment, the allowed power ACWENB is replaced by the precedent target power $IHO_{n-1}$ when the current target power IHO is a predetermined value larger than the allowed power ACWENB or when the actual power IHR is limited to the allowed power ACWENB for a predetermined time period. However, the replacement can be made either only when the target power IHO is a predetermined value larger than the allowed power ACWENB or only when the actual power IHR is limited to the allowed power ACWENB for a predetermined time. The replacement can be made under the following conditions: the actual power IHR is limited to the allowed power ACWENB for a predetermined time; and the target power IHO is a predetermined value larger than the allowed power ACWENB.

If it is necessary to protect the first and second electric heaters 53a, 53b, control unit 19 can include means for calculating an allowed-power-for-protection which calculates an amount of allowed power for protection (hereinafter referred to as APP) beforehand. Then, the means for limiting power limits an amount of the power supply to APP if the target power IHO is larger than APP, and the precedent target power $IHO_{n-1}$ is replaced by APP.

The above control can be applied to the motor-driven compressor 16. In that case, a target rotation speed is calculated based on a precedent target rotation speed, and an amount of electric power (target power) to be supplied to the motor-driven compressor 16 to rotate at the target rotation speed is calculated. If the target power is larger than an allowed power, the power to be supplied to the compressor 16 is limited to the allowed power. If the power supply to the compressor is limited to the allowed power, the precedent target rotation speed is replaced by an actual rotation speed of the compressor 16.

The total amount of the target power IHO of the first and second electric heaters 53a, 53b and the target power of the motor-driven compressor 16 may be applied to the required amount for air conditioning A/C REQ, and the total amount of the allowed power for the first and second electric heaters 53a, 53b and the allowed power for the motor-driven compressor 16 may be applied to the allowed power for air conditioning ACWENB. If the allowed power ACWENB is smaller than the target power A/C REQ, it is desirable to supply power to the motor-driven compressor 16 first. In other words, the power supply to the first and second electric heaters 53a, 53b is controlled to control the total power within the allowed power for air conditioning ACWENB.

The first and second electric heaters 53a, 53b can use other heater elements such as PTC heaters instead of sheathed heater elements. The first and second electric heaters 53a, 53b can be disposed in the air duct 13 near the heater core to directly heat the air-conditioned air. The above-described embodiments of the invention can be applied to other refrigeration cycle that includes a heat pump.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A power supply control apparatus for a vehicle equipped with a plurality of electric devices that are powered by a battery, said power supply control apparatus comprising:

means for calculating current target power that is necessary for a specific electric device of the plurality of electric devices based on a precedent target power calculated previously;

means for calculating allowed power that is allowed to be supplied to said specific electric device based on total power demand of the vehicle;

means for limiting power to be supplied to said specific device to the allowed power if the current target power is larger than the allowed power; and means for replacing the precedent target power with the allowed power if an actual power supplied to said specific electric device is limited to the allowed power.

2. The power supply control apparatus as claimed in claim 1, wherein said replacing means replaces the precedent target power with the allowed power only when a time period during which the actual power supplied to said specific electric device is limited to the allowed power is longer than a predetermined time.

3. The power supply control apparatus as claimed in claim 1, wherein said replacing means replaces the precedent target power with the allowed power only when the current target power is a predetermined value larger than the allowed power.

4. The power supply control apparatus as claimed in claim 1, wherein said replacing means replaces the precedent target power with the allowed power only when a time period during which the actual power supplied to said specific electric device is limited to the allowed power is longer than predetermined time and the current target power is a predetermined value larger than the allowed power.

5. The power supply control apparatus as claimed in claim 1, further comprising:
means for calculating an allowed-power-for-protection when said specific electric device is to be protected; and
the limiting means limits power supplied to said specific electric device to the allowed-power-for-protection when the current target power is larger than the allowed-power-for-protection;
wherein said replacing means replaces the precedent target power with the allowed-power-for-protection.

6. The power supply control apparatus as claimed in claim 1, wherein said specific electric device is an electric heater.

7. A power supply control apparatus for a vehicle that is equipped with a plurality of electric devices that are powered by a battery, said power supply control apparatus comprising:
means for calculating a target value of an operating condition of a specific electric device of the plurality of electrical devices based on a precedent target value of the operating condition calculated previously;
means for calculating a target power that is necessary for said specific electric device;
means for calculating allowed power that is allowed to be supplied to said specific electric device based on total power demand of the vehicle;
means for limiting power to be supplied to said specific device to the allowed power if the target power of the operating condition of said specific device is larger than the allowed power; and
means for replacing the precedent target value of the operating condition with an actual value of the operating condition if an actual power supplied to said specific electric device is limited to the allowed power.

8. The power supply control apparatus as claimed in claim 7, wherein said replacing means replaces the precedent target value with the actual value only when a time period during which the actual power supplied to said specific electric device is limited to the allowed power is longer than a predetermined time.

9. The power supply control apparatus as claimed in claim 7, wherein said replacing means replaces the precedent target value with the actual value only when the current target power is a predetermined value larger than the allowed power.

10. The power supply control apparatus as claimed in claim 7, wherein said replacing means replaces the precedent target value with the actual value only when a time period during which the actual power supplied to said specific electric device is limited to the allowed power is longer than a predetermined time and the target power of the operating condition of said specific electric device is a predetermined value larger than the allowed power.

11. The power supply control apparatus as claimed in claim 7, further comprising:
means for calculating an allowed-power-for-protection when said specific electric device is to be protected; and
the limiting means limits power supplied to said specific electric device to the allowed-power-for-protection when the current target power is larger than the allowed-power-for-protection;
wherein said replacing means replaces the precedent target value of the operating condition with the actual value.

12. The power supply control apparatus as claimed in claim 7, wherein said specific electric device is a motor-driven compressor, and the operating condition is a rotation speed of said compressor.

13. A power supply control apparatus for a vehicle that is equipped with a plurality of electric devices that are powered by a battery, said power supply control apparatus comprising:
a first control unit including means for calculating a target power to be supplied to a specific electric device of the plurality of electrical devices and first means for transmitting a signal indicating the calculated target power to a second control unit; and
the second control unit includes means for calculating an allowed power and second means for transmitting a signal to the first control unit indicating the allowed power if the target power is higher than the allowed power;
wherein said first control unit limits power to be supplied to said specific electric device, and said first transmitting means feeds back the signal indicating the allowed power to said calculating means.

14. The power supply control apparatus as claimed in claim 13, wherein said first control unit replaces said target power with said allowed power when the allowed power is a predetermined value smaller than said target power.

15. The power supply control apparatus as claimed in claim 13, wherein said specified electric device is an air-conditioning electric device, and said second control unit is a power control unit for controlling power supply to a different one of said plurality of electrical devices.

* * * * *